J. I. ARBOGAST.
MACHINE FOR FORMING AND BLOWING GLASS ARTICLES.
APPLICATION FILED NOV. 11, 1909.
998,735.
Patented July 25, 1911.
2 SHEETS—SHEET 1.
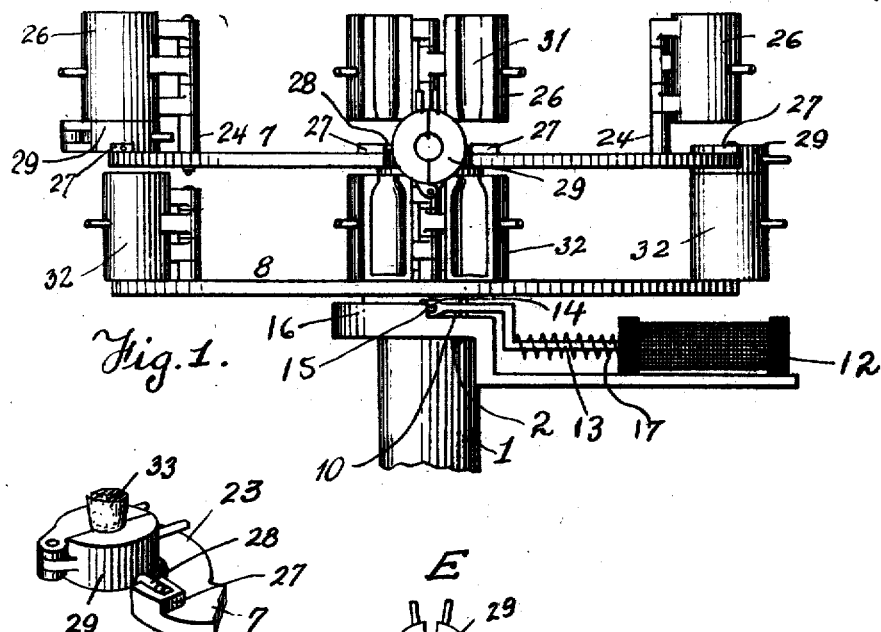
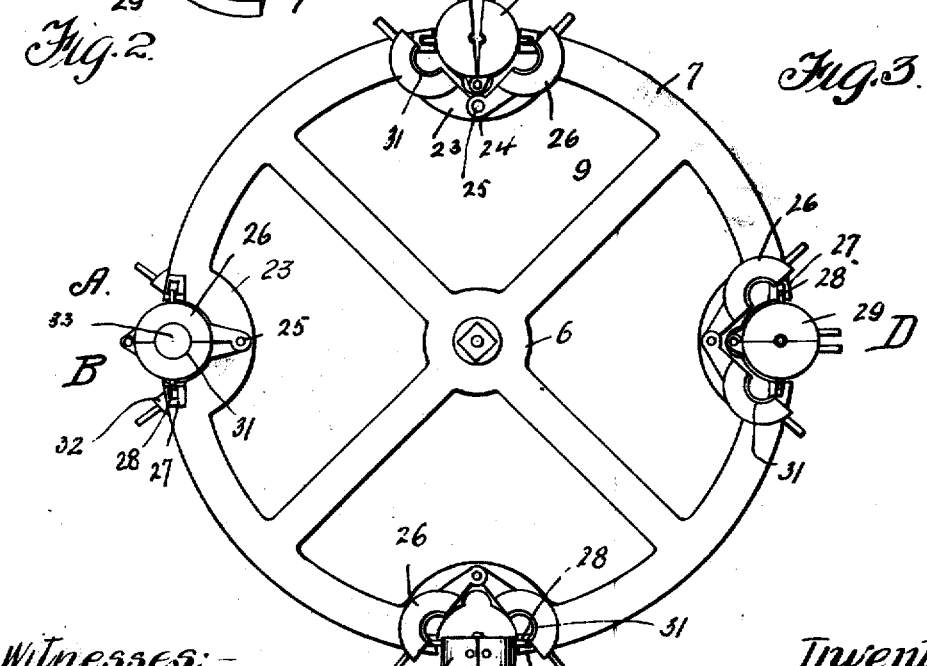
Witnesses:
Samuel Payne
R. H. Butler
Inventor
John I. Arbogast.
by
Attorneys

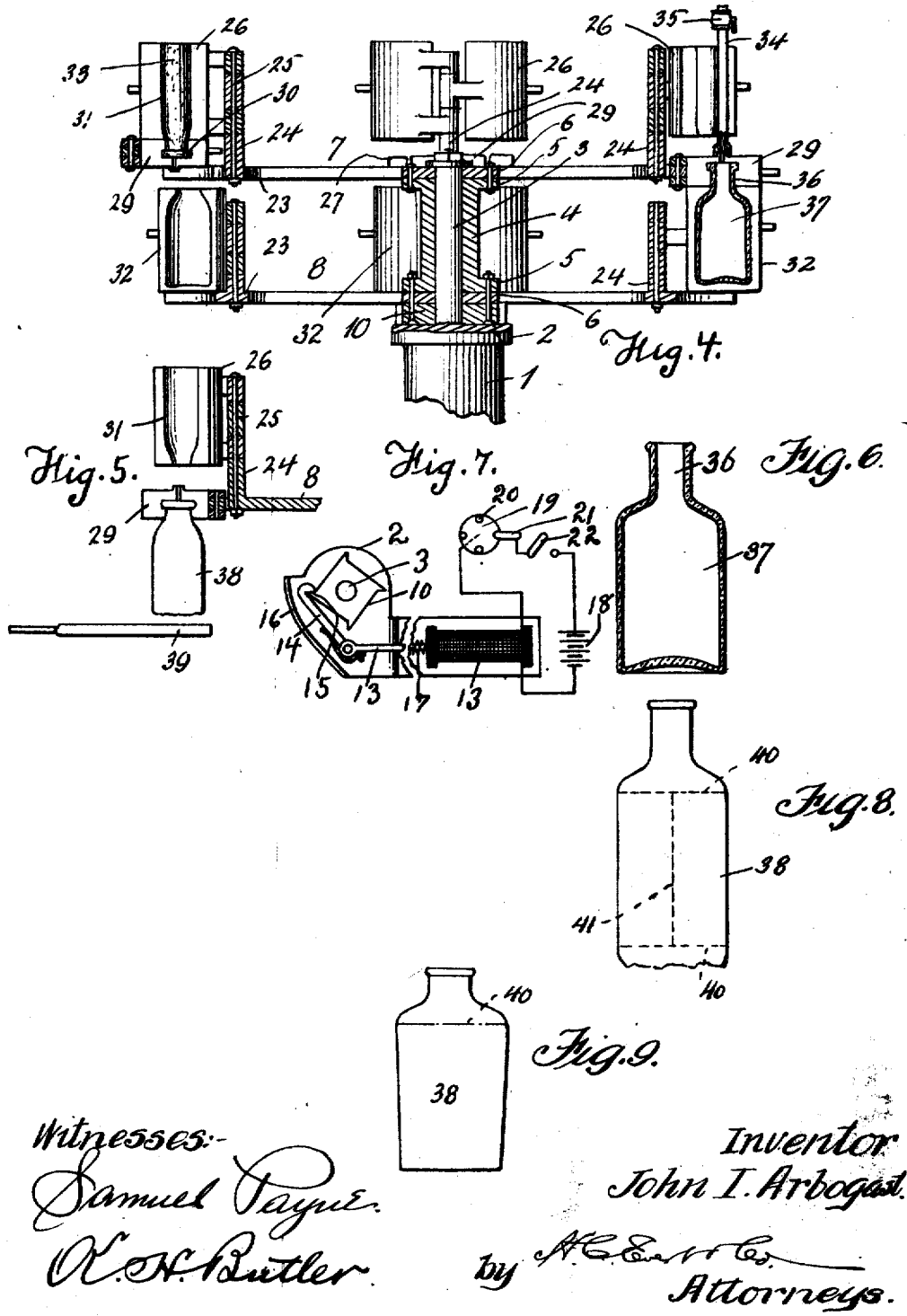

UNITED STATES PATENT OFFICE.

JOHN I. ARBOGAST, OF PITTSBURG, PENNSYLVANIA.

MACHINE FOR FORMING AND BLOWING GLASS ARTICLES.

998,735.   Specification of Letters Patent.   Patented July 25, 1911.

Application filed November 11, 1909. Serial No. 527,542.

*To all whom it may concern:*

Be it known that I, JOHN I. ARBOGAST, a citizen of the United States of America, residing at S. S. Pittsburg, in the county of Allegheny and State of Pennsylvania, have invented certain new and useful Improvements in Machines for Forming and Blowing Glass Articles, of which the following is a specification, reference being had therein to the accompanying drawing.

This invention relates to a machine for forming and blowing glass articles, and more particularly to the shaping of glass into bottles and similar receptacles having narrow necks.

The object of my invention is to provide a machine of the above type for expeditiously and economically producing glass receptacles having symmetrical proportions, regular contours and artistic features which characterize the highest grade of either hand-work or machine-made glass articles.

My invention in its broadest aspect comprehends the use of manual labor in connection with my machine for producing artistic ware with as great a rapidity and with a greater degree of accuracy and perfection than automatic machines which have been devised in an attempt to accomplish the same results. I have ascertained by actual experience that the fluidity, consistency or fragility of glass will not permit automatic machines to obtain that degree of perfection and uniformity as when under manual control. Furthermore, it has been heretofore impossible to obtain perfect narrow-necked bottles by the use of automatic machines, particularly by a continuance or step-to-step operation. I am aware that the production of such ware has been attempted, for instance by machines disclosed in Patents No. 568287 granted C. V. Arbogast Sept. 22, 1896, and No. 766,768 granted M. G. Owens Aug. 2, 1904. In the first patent an apparatus is shown for making hollow glass ware and it is impossible to expeditiously and continuously carry on the method therein described especially when it is desired to produce ware as rapidly as glass can be gathered and introduced into the blank mold. In the last mentioned patent, which discloses an exceedingly large and expensive machine, considerable trouble is experienced in maintaining the same in an operative condition and in connection with this machine, as well as the one heretofore referred to, it is impossible to produce glass ware of the highest order having the requisite qualifications from either an esthetic or commercial standpoint.

It is a well known fact that glass has certain well defined limitations, since it is so susceptible in its plastic state to the least perceptible change in the atmosphere, in the condition of a mold and in the manner in which it is handled. For instance, glass in its proper condition need only be guided to the form desired and it is very easily moved when in this condition, but allow it to slightly cool and then it is impossible for any force to move it without rupturing, crizzling, or cracking the glass. A large percentage of narrow-necked articles made by automatic machines are cracked or have imperfections that necessitates the use of a gas jet in order to weld or remove the cracks or imperfections, thus adding expense to the production of articles produced by an automatic machine. Further, glass is susceptible when in its plastic state to changes so far as heat is concerned. As an instance, a draft around an automatic machine will cool the plastic glass almost twice as fast as a still atmosphere, consequently handling it automatically it is impossible to obtain two successive blanks of the same temperature. Furthermore, two batches of molten glass, even though they are made from the same material and obtained from a common source or mixture, are not always of the same consistency or nature. Sometimes it is soft and at other times it acquires a hard consistency or nature, and the means for working glass of a hard or soft nature are altogether different. As an example, soft natured glass requires patience and slow working while hard natured glass must be rapidly used and worked. It is therefore apparent that with glass in its plastic state that it requires manual labor and the best of judgment to handle the same and produce the best results. An automatic machine as shown in Patent 766,768 cannot handle each batch of plastic material as it should be handled and as its own condition requires. It is this last mentioned machine that I aim to eliminate as a factor in the production of glass ware by providing a machine that is simple in construction, durable, easy to operate, capable of producing first-class ware, and highly efficient for the production of various styles and sizes of articles. With this understanding of the above recited objects, my invention will be hereinafter considered in detail and then claimed, and reference will now be had to the drawings forming a part of this specification, wherein there is illustrated the preferred embodiments of my invention, but it is to be understood that the structural elements thereof can be varied or changed as to the size, proportion and manner of assemblage without departing from the spirit and scope of the invention as claimed.

In the drawings:—Figure 1 is a side elevation of my machine partly broken away. Fig. 2 is a perspective view of a neck ring adapted to form part of the machine. Fig. 3 is a plan of the same. Fig. 4 is a vertical sectional view of a portion of the machine. Fig. 5 is a vertical sectional view of a portion of the machine adapted to be used in the production of cylinders from which window glass is made. Fig. 6 is a vertical sectional view of an article adapted to be made by my improved machine. Fig. 7 is a horizontal sectional view of a portion of the machine illustrating a means for intermittently moving parts of the machine. Fig. 8 is a side elevation of a cylinder adapted to be produced by the machine and from which window glass can be made, and Fig. 9 is an elevation of another form of article which can be produced by the machine.

In the accompanying drawings, the reference numeral 1 denotes a pedestal having the upper end thereof enlarged to provide a bearing 2 formed with a central vertical post 3. Revolubly mounted upon the post 3 is a carrier comprising a vertically-disposed sleeve 4 having each end provided with a peripheral flange 5. Bolted, riveted or otherwise secured to said flanges are the hubs 6 of circular frames 7 and 8, said frames being supported in a horizontal position by radially disposed arms or spokes 9 and with the frame 7 superimposed relative to the frame 8, the height of the frame 7 above the frame 8 being determined by the length of the sleeve 4 and the depth of the molds to be carried upon the frame 8. The same fastening means employed for securing the frame 8 to the lower end of the sleeve 4 is employed for securing a ratchet wheel 10 to the under side of the hub 6 of the frame 8. The number of teeth carried by the ratchet wheel 10 corresponds to the number of molds carried by the frame 8, and in connection with the ratchet wheel 10 a suitable mechanism or device is employed for imparting an intermittent movement to the frames 7 and 8, which through the medium of the sleeve 4 and their connections are adapted to move in unison. As an example of a device that can be used for intermittently revolving the frames 7 and 8 reference will be had to Figs. 1 and 7.

The pedestal 1 is provided with a bracket 11 adapted to support a solenoid 12 having the core 13 thereof provided with a pivoted pawl 14 adapted to engage the teeth 15 of the ratchet wheel 10 for intermittently rotating the latter, said pawl in its operative movement being guided and held in engagement with the teeth of the ratchet wheel by a vertical guide flange 16 provided therefor upon the bearing 2. The core 13 of the solenoid is provided with a retractile spring 17 adapted to restore the core and pawl 14 to their normal position when the solenoid 12 is deënergized. It is obvious that a suitable source of electrical energy, as batteries 18, is used in connection with the solenoid, and for successively energizing the solenoid a rotary switch 19 can be used and driven by suitable power (not shown). The switch 19, as I have illustrated the same, comprises a revoluble disk provided with contacts 20 corresponding in number to the teeth of the ratchet wheel 10, and the contacts 20 are adapted to engage a contact arm 21 and establish a circuit through the solenoid each and every time one of the contacts 20 engages the arm 21. An ordinary hand-switch 22 can be incorporated in the circuit whereby the circuit can be broken, without a cessation in the operation of the rotary switch, when it is desired to stop the machine.

The circular revoluble frames 7 and 8 are identical in construction. The periphery of each frame intermediate the ends of the arms or spokes 9 is off-set by an inwardly projecting semi-circular mold-supporting portion 23, each portion being provided with a central hinge-post 24. Connected to the hinge-post 24 of the frame 7 by pins 25 are blank-molds 26 made in two parts adapted to be closed when receiving a gathering of glass and adapted to be swung open to release the gathering of glass after it has been shaped into a blank by said molds. The portion 23 of the frame 7 at diametrically opposed points, which are within the circumference of the frame, is provided with sockets 27 for the trunnions 28 of neck-rings 29, these rings being made of hinge sections, whereby they can be slightly opened, as best shown at the upper side of Fig. 3, and in order to provide clearance for the trunnions 28, said trunnions are loosely mounted in the sockets 27 and said sockets shaped to allow sufficient movement of the trunnions in slightly separating the parts of the neckring. As best shown in Fig. 1 of the drawings, the blank-molds 26 when closed are adapted to maintain the neck-rings in a horizontal position in engagement with the lower ends of the blank-molds and the neck-forming recess 30 of the neckring in communication with the blank-forming recesses 31 of the blank-molds 26, whereby the molten glass placed in the blank-molds will enter the neck-forming recesses 30 of the neck-rings and the blank formed as shown at the left-hand side of Fig. 4.

The revoluble frame 8 located beneath the frame 7 is provided with blow-molds 32 made in two parts and adapted to be opened to receive the blank from the blank-molds and closed during the blowing operation, as will hereinafter appear. The height of the frame 7 above the frame 8 is such that during the preparation of the blank the neck-rings 29 can coöperate with the blank-molds 26, then swing into position to coöperate with the blow-molds 32 during the blowing of the blank. The fact that the neck-rings serve first the blank-molds and then the blow-molds and are essential in causing these molds to coöperate in producing an article will appear in the general operation of the machine, as it will now be described particularly in connection with Fig. 3 of the drawings.

As heretofore stated, I aim to use manual labor in connection with the machine, and as an example of the labor employed, I will assume that a boy is stationed at the point designated A for gathering glass and placing it in the closed blank-mold 26. Another boy can be stationed at the point B for cutting or severing the glass that enters the blank-mold 26 from the gatherer. These two operations have been performed while the frames 7 and 8 are stationary, and the rotary switch 19 is timed or regulated so that immediately upon these two operations being completed the frames 7 and 8 will be revolved in unison and the blank-mold 26 that was filled with molten glass will be shifted to a boy stationed at the point C. When the molten glass is placed in the blank-mold it immediately conforms to the recesses 30 and 31 in the neck-ring and blank-mold and by the time it reaches the boy stationed at the point C, sufficient time has lapsed for it to form a blank 33. Upon the blank-mold reaching the boy at the station C the blank-mold is opened, releasing the upper part of the blank 33 while the lower part is held by the neck-ring. The neck-ring then tilts and the blank 33 is inverted and swung into the blow-mold 32 located beneath the blank-mold, which is opened to receive the blank. The boy at the station C controls the movement of the blank 33 in swinging into the blow-mold and he can close the blow-mold upon the blank or allow this operation to be performed by the boy stationed at the blow-pipe. Assuming however that the blow-mold is closed by the boy stationed at the point C, the frames 7 and 8 are again revolved and stopped in front of a boy located at station D. The boy at this station closes the blow-mold, if it has not been previously done by the boy at the station C, and lowers the blow-pipe 34 suitably supported above the frames 7 and 8. The blow-pipe 34 is adapted to receive air from a suitable source and the passage of air through said pipe is controlled by a suitable valve 35. Since the blank-mold located above the blow-mold has remained open during the movement of the frames 7 and 8, the blow-pipe 34 can be easily pulled down by the boy at the station D and a sufficient quantity of air injected into the blow-mold to blow the blank and form the article shown at the right-hand side of Fig. 4. By the time that the boy stationed at the point D has shut off the air and raised the pipe 34, the frames 7 and 8 are adapted to again move and upon reaching the boy stationed at the point E, the neck-ring 29 is slightly opened to release the neck 36 of the article 37 and then the blow-mold is opened and the article discharged from the machine. It is at the station or point E that the blank-mold above the blow-mold can be closed, whereby when it again passes to the boy stationed at the point A, it will be in position to receive the glass gathered by the boy.

From the foregoing it will be observed that five boys are employed in connection with the machine and as each and every one of these boys are skilled in their particular line, they are enabled to judge the character of the work produced by the machine and regulate the operation of the machine in order that the work will be properly performed. For instance, the boy at the station C when releasing the blank 33 from the blank-mold can readily determine there and then that the blank is properly shaped, and it is at this particular station that the neck-ring coöperates with both molds by being invertible or capable of holding the blank while it is swung from the blank-mold into the blow-mold. The importance of the invertible neck-ring is therefore apparent, when it is considered that the blown hollow articles can be produced just as rapidly as the boy at the station A can gather glass. The output of the machine is therefore as great as any automatic machine and a greater degree of certainty is obtained in view of the fact that each operation is under the control of an operator skilled to determine the accuracy of each operation.

Before further considering the machine for the production of blown hollow ware, reference will be had to Fig. 5 of the drawing wherein I have illustrated a portion of the machine that can be used for manufacturing window glass. It is only necessary to use the upper revoluble frame 7 and in this instance the blank-molds can be made very large to produce blanks of considerable length, which are adapted to be suspended from the frame 7 by the neck-rings 29. The blank 38 as shown in Figs. 5 and 8 can be of any desired length, and after the blank has been released from the blank-mold, the table 7 is revolved to a desired position, the blow-pipe 34 lowered and the blank blown, for instance to the size shown in Fig. 8. It is during this blowing operation that a boy can be stationed with a buffer 39 to control the formation and movement of the lower end of the blank as it is blown, thereby preventing any irregularities that might terminate by blowing out. After the article has been blown to form a cylinder, the ends of the cylinder can be capped at the places indicated 40 in the ordinary and well-known manner, and then the cylinder fractured or split, as indicated at 41, thus preparing the cylinder to be placed upon a flattening stone within an oven and spread out to form a sheet of glass.

Having now described my invention what I claim as new, is:—

1. A machine of the type described comprising superimposed frames revoluble about a vertical axis, a plurality of blank molds arranged upon the uppermost frame, a plurality of blow molds located upon the lowermost frame beneath the blank mold of the uppermost frame, invertible neck rings adapted to first coöperate with said blank molds and then invert and coöperate with said blow molds and provided with trunnions, and supporting means for the trunnions carried by the upper of said frames, said supporting means of a length with respect to the trunnions to allow the neck rings to be slightly opened.

2. A machine of the type described comprising superimposed frames revoluble about a vertical axis, a plurality of blank molds arranged upon the uppermost frame, a plurality of blow molds located upon the lowermost frame beneath the blank molds of the uppermost frame, invertible neck rings adapted to first coöperate with said blank mold and then invert and coöperate with said blow molds and provided in proximity to one face with oppositely-disposed trunnions, and said upper frame having its upper face provided with sockets for the reception of said trunnions, said sockets of such length with respect to the trunnions as to allow said neck rings to be slightly opened.

3. A machine of the type described comprising superimposed frames revoluble about a vertical axis, a plurality of sectional blank molds arranged upon the uppermost frame and capable of being opened, a plurality of sectional blow molds located upon the lowermost frame beneath the blank molds of the uppermost frame and capable of being opened, said blow molds and said blank molds provided with handles, invertible neck rings each formed of a plurality of sections hinged together and adapted to first coöperate with said blank molds and then invert and coöperate with said blow molds, a trunnion projecting laterally from each of the sections of each ring and positioned in proximity to one face of its respective section, and supporting means carried by the upper face of the uppermost frame for said trunnion.

4. A machine of the type described comprising superimposed frames revoluble about a vertical axis, a plurality of sectional blank molds arranged upon the uppermost frame and capable of being opened, a plurality of sectional blow molds located upon the lowermost frame beneath the blank molds of the uppermost frame and capable of being opened, said blow molds and said blank molds provided with handles, invertible neck rings each formed of a plurality of sections hinged together and adapted to first coöperate with said blank molds and then invert and coöperate with said blow molds, a trunnion projecting laterally from each of the sections of each ring and positioned in proximity to one face of its respective section, and means carried by the upper face of the uppermost frame and constituting sockets for the reception of the trunnion, said sockets of such length with respect to the trunnion as to allow the neck rings to be slightly opened, and a handle for each section of the neck ring.

5. A machine of the type described comprising superimposed frames revoluble about a vertical axis, a plurality of blank molds arranged upon the uppermost frame, a plurality of blow molds located upon the lowermost frame beneath the blank molds of the uppermost frame, invertible neck rings adapted to first coöperate with said blank mold and then invert and coöperate with said blow molds and provided with oppositely-disposed trunnions, and said upper frame having its upper face provided with sockets for the reception of said trunnions, said sockets of such length with respect to the trunnions as to allow said neck rings to be slightly opened, and said uppermost frame cut-away at its edges to provide clearances for the shifting of the neck rings.

6. A machine of the type described comprising superimposed frames revoluble about a vertical axis, a plurality of sectional blank molds arranged upon the uppermost frame and capable of being opened, a plurality of sectional blow molds located upon the lowermost frame beneath the blank molds of the uppermost frame and capable of being opened, said blow molds and said blank molds provided with handles, invertible neck rings each formed of a plurality of sections hinged together and adapted to first coöperate with said blank molds and then invert and coöperate with said blow molds, a trunnion projecting laterally from each of the sections of each ring and positioned in proximity to one face of its respective section, and supporting means carried by the upper face of the uppermost frame for said trunnions, and said uppermost frame cut-away at its edges to provide clearances for the shifting of the neck rings.

7. A machine of the type described comprising superimposed frames revoluble about a vertical axis, a plurality of sectional blank molds arranged upon the uppermost frame and capable of being opened, a plurality of sectional blow molds located upon the lowermost frame beneath the blank molds of the uppermost frame and capable of being opened, said blow molds and said blank molds provided with handles, invertible neck rings each formed of a plurality of sections hinged together and adapted to first coöperate with said blank molds and then invert and coöperate with said blow molds, a trunnion projecting laterally from each of the sections of each ring and positioned in proximity to one face of its respective section, and means carried by the upper face of the uppermost frame and constituting sockets for the reception of the trunnion, said sockets of such length with respect to the trunnion as to allow the neck rings to be slightly opened, and a handle for each section of the neck rings, and said uppermost frame cut away at its edges to provide clearances for the shifting of the neck rings.

8. A machine of the type described comprising superimposed frames, means for connecting the frames together at the center thereof, a pedestal, a vertically-disposed post carried by the pedestal and extending through said means and frame and about which said frames are capable of revolving, a ratchet wheel secured to the lowermost frame and through which extends said post, means engaging with said ratchet wheel for intermittently rotating said frames, a plurality of blank molds arranged upon the uppermost frame, a plurality of blow molds located upon the lowermost frame beneath the blank molds of the uppermost frame, invertible neck rings adapted to first coöperate with said blank molds and then invert and coöperate with said blow molds and provided with trunnions, and supporting means for the trunnions carried by the upper of said frames.

9. A machine of the type described comprising superimposed frames, means for connecting the frames together at the center thereof, a pedestal, a vertically-disposed post carried by the pedestal and extending through said means and frame and about which said frames are capable of revolving, a ratchet wheel secured to the lowermost frame and through which extends said post, means engaging with said ratchet wheel for intermittently rotating said frames, a plurality of blank molds arranged upon the uppermost frame, a plurality of blow molds located upon the lowermost frame beneath the blank molds of the uppermost frame, invertible neck rings adapted to first coöperate with said blank molds and then invert and coöperate with said blow molds and provided with trunnions, and supporting means for the trunnions carried by the upper of said frames, said supporting means of such length with respect to the trunnions as to allow the neck rings to be slightly opened.

In testimony whereof I affix my signature in the presence of two witnesses.

JOHN I. ARBOGAST.

Witnesses:
 KARL H. BUTLER,
 MAX H. SROLOVITZ.